Patented Aug. 11, 1925.

1,549,426

UNITED STATES PATENT OFFICE.

JOHN MORRIS WEISS, OF NEW YORK, N. Y.

PROCESS FOR THE REMOVAL OF CARBON BISULPHIDE FROM GAS.

No Drawing.   Application filed March 29, 1924. Serial No. 702,896.

*To all whom it may concern:*

Be it known that I, JOHN MORRIS WEISS, a citizen of the United States, and residing at 510 West 110th Street, in the city of New York and State of New York, have invented a Process for the Removal of Carbon Bisulphide from Gas, of which the following is a specification.

Manufactured gas is ordinarily made either by the destructive distillation of coal or by the pyrolytic decomposition of petroleum oils. The crude gases as formed contain sulphur compounds resulting from the decomposition of sulphur compounds in the original raw materials used for gas manufacture. If the gas is burned in the crude state, these sulphur compounds give rise to sulphur dioxide in the products of combustion. This is undesirable and hence, municipalities and States have in most cases established regulations limiting the sulphur content of gas furnished the public for domestic purposes. Industrially, where gas engines are used, sulphur dioxide in the burnt gases may cause corrosion in the engine parts. Thus a low sulphur content in gas is extremely desirable.

The sulphur content of gas exists mainly as hydrogen sulphide and the so-called carbon bisulphide. The former can be and is removed from gas during the purification process by treating with iron oxide, thereby removing the hydrogen sulphide as non-volatile iron sulphide or by scrubbing with an aqueous alkaline medium, absorbing the hydrogen sulphide in the form of alkali sulphides.

The term "organic sulphur" in ordinary usage represents the sulphur in compounds other than hydrogen sulphide. In gas from coal this "organic sulphur" is largely in the form of carbon bisulphide, and to a lesser extent, the organic sulphur in gases of petroleum origin (for example, oil gas and carburetted water gas) also exists in the form of this same compound. As the ordinary purification processes remove hydrogen sulphide but not carbon bisulphide, gas works must be careful to select coals which give an "organic sulphur" well below the sulphur maximum set by the political division under whose regulation it operates. This often results in their being compelled to purchase coals geographically quite distant from the gas works when coals satisfactory, except for their sulphur content, are available locally at a materially cheaper price.

Various processes have been proposed for the removal of carbon bisulphide but these have been unsatisfactory in one way or another, being inefficient, expensive or difficult to operate and none of the proposed processes have been generally adopted in gas works practice. The invention which is later described in this specification does remove carbon bisulphide from gas effectually and cheaply and without specially designed apparatus, utilizing equipment which is already standard in the gas industry.

I have discovered that manufactured gases, the majority of which contain carbon bisulphide, can be economically purified and substantially freed of this impurity by passing them through aniline or a similar amino body or preferably a water solution or suspension of the amino body. The type reaction may be represented as follows:

$$2\ C_6H_5NH_2 + CS_2 = CS(C_6H_4NH_2) + H_2S$$

The primary products of the reaction when aniline or aniline water is used as the absorbent, are thiocarbanilide and hydrogen sulphide. The former is not volatile, does not carry on with the gas and can be recovered, if desired; the latter may be removed in any convenient manner as, for example, by an iron oxide purifier or an alkaline washer. Or, if desired, the water solution or suspension of amine may contain sufficient alkali to absorb the hydrogen sulphide formed by the reaction, such a procedure having the further advantage of accelerating the combination by the removal of hydrogen sulphide as formed. For example, if aniline is being used, the solution may contain approximately 50 parts of caustic soda for every 100 parts of aniline. In this case no after scrubber to remove hydrogen sulphide of reaction is necessary.

I prefer to practice the invention on gas which has been already freed of its hydrogen sulphide content by one of the absorbent methods used for that purpose, but in certain cases it may be desirable to have the carbon bisulphide scrubber precede the hydrogen sulphide absorber. I also consider as part of my invention the use of aniline or other organic amine as a purifying agent for gas containing carbon bisulphide if used in combination with other processes of gas washing as, for example, the addition of an amine to a sodium carbonate or other alkaline solution used to absorb hydrogen sulphide.

Accelerating agents such as sulphur may be added in small amount, which have the effect of increasing the speed of reaction between aniline and carbon bisulphide, thereby reducing the contact time required. Under like conditions, an increase of temperature speeds the reaction, but with sufficient contact the reaction proceeds with satisfactory speed at ordinary atmospheric temperatures.

The purifying liquid after use may be treated to recover its thiocarbanilide content. If excess of caustic alkali is used in the scrubber, the thiocarbanilide will be in solution and may be precipitated by adding a mineral acid. If alkali is not used, the thiocarbanilide will be in suspension and may be recovered by extraction or filtration.

My process may be carried out in any suitable apparatus for bringing about contact between a liquid and a gas and the invention is not dependent on the type of apparatus in which the invention is carried out.

The process is generally applicable to the removal of carbon bisulphide from a gaseous mixture and the strength of solution, time of contact and other conditions may be varied, depending on the concentration and other characteristics of the gas mixture treated. In using the term "gas" in the specification and claims I intend to include all combustible gaseous mixtures either artificial or natural which are used for fuel, power or illuminating purposes.

Having thus specifically described my invention, I claim:

1. The removal of carbon bisulphide from gas, comprising bringing said gas into contact with a water solution of an organic amine.

2. The removal of carbon bisulphide from gas, comprising bringing said gas into contact with a water solution of aniline.

3. The removal of carbon bisulphide from gas, comprising bringing said gas into contact with a water solution of an organic amine and an alkali.

4. The removal of carbon bisulphide from gas, comprising bringing said gas into contact with a water solution of aniline and an alkali.

5. The removal of carbon bisulphide from gas, comprising bringing said gas into contact with a water solution of aniline, an alkali and sulphur.

6. The removal of carbon bisulphide from gas, comprising bringing said gas into contact with a mixture of water and aniline.

7. The removal of carbon bisulphide from gas, comprising bringing said gas into contact with a mixture of water and aniline and recovering thiocarbanilide.

8. The process of purification of gas comprising bringing said gas into contact with a water solution of an organic amine to remove carbon bisulphide and removing the hydrogen sulphide formed by the action of the carbon bisulphide and the organic amine.

9. The process of purification of gas comprising bringing said gas into contact with a water solution of aniline to remove carbon bisulphide and removing the hydrogen sulphide formed by the action of the carbon bisulphide and the aniline.

10. The process of purification of gas comprising bringing said gas into contact with a water solution of aniline to remove carbon bisulphide, removing the hydrogen sulphide formed by the action of the carbon bisulphide and the aniline and recovering thiocarbanilide.

11. The process of purification of gas obtained by the destructive distillation of coal comprising bringing said gas into contact with a water solution of an organic amine to remove carbon bisulphide and removing the hydrogen sulphide formed by the action of the carbon bisulphide and the organic amine.

12. The process of purification of gas obtained by the destructive distillation of coal comprising bringing said gas into contact with a water solution of aniline to remove carbon bisulphide and removing the hydrogen sulphide formed by the action of the carbon bisulphide and the aniline.

13. The process of purification of gas obtained by the destructive distillation of coal comprising bringing said gas into contact with a water solution of aniline to remove carbon bisulphide, removing the hydrogen sulphide formed by the action of the carbon bisulphide and the aniline and recovering thiocarbanilide.

14. The process of purification of gas comprising bringing said gas into contact with a water solution of an organic amine and an alkali to remove carbon bisulphide and removing the hydrogen sulphide formed by the action of the carbon bisulphide and the organic amine.

15. The process of purification of gas comprising bringing said gas into contact with a water solution of aniline and an alkali to remove carbon bisulphide and removing the hydrogen sulphide formed by the action of the carbon bisulphide and the aniline.

16. The process of purification of gas comprising bringing said gas into contact with a water solution of aniline and an alkali to remove carbon bisulphide, removing the hydrogen sulphide formed by the action of the carbon bisulphide and the aniline and recovering thiocarbanilide.

17. The removal of carbon bisulphide from gas comprising bringing said gas into contact with an aqueous solution of an organic amine and a reaction accelerator.

18. The removal of carbon bisulphide from gas comprising bringing said gas into contact with an aqueous solution of aniline and a reaction accelerator.

In testimony whereof, I hereby affix my signature.

JOHN MORRIS WEISS.